W. Osborn.
Pressing.
No. 933. Reissued Mar. 27, 1860.
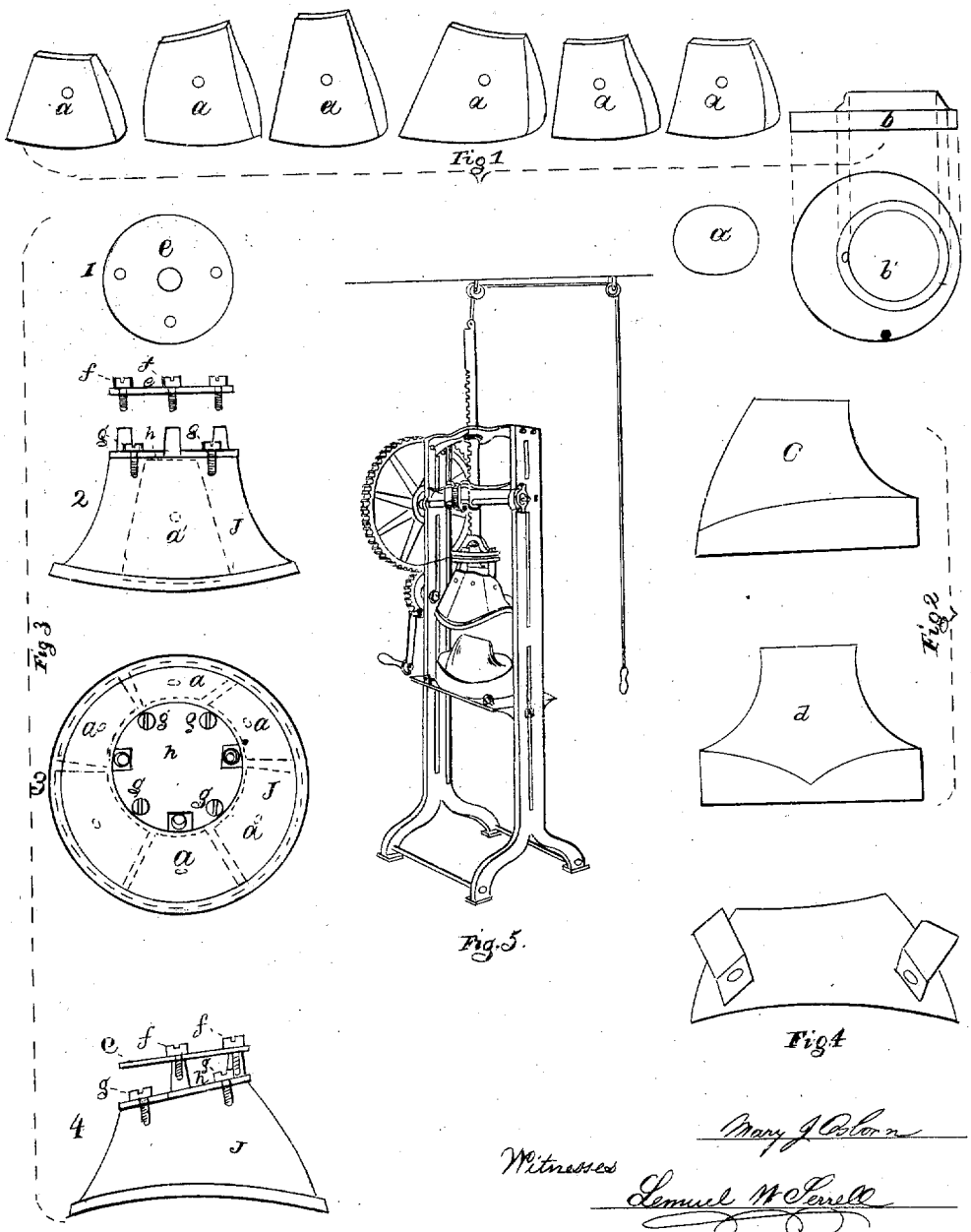
Witnesses
Mary J. Osborn
Samuel W. Ferrell
Thos. Geo. Harold

UNITED STATES PATENT OFFICE.

MARY JANE OSBORN, OF LOUISVILLE, KENTUCKY, ADMINISTRATRIX OF WILLIAM OSBORN.

IMPROVEMENT IN MACHINES FOR PRESSING BONNETS, BONNET-FRAMES, &c.

Specification forming part of Letters Patent No. 15,570, dated August 19, 1856; Reissue No. 427, dated February 17, 1857; Reissue No. 933, dated March 27, 1860.

*To all whom it may concern:*

Be it known that WILLIAM OSBORN, deceased, of the city of Louisville, county of Jefferson, and State of Kentucky, did invent a new and useful means for pressing all kinds of bonnets and similar articles and pressing and forming buckram frames for bonnets; and I, MARY JANE OSBORN, executrix, do hereby declare that the following is a full, clear, and exact description of the construction and operation of the same, reference being had to the annexed drawings, making part of this specification, wherein—

Figure 5 is a perspective view of the whole machine.

In Fig. 1, *a a a a a a* are heaters, to be placed all around the sides of the upper die. The small heater *a'* is the one that goes on the top of the upper die to heat the tip of said upper die. *b b'* is the heater for the block or lower die.

In Fig. 2, *c* and *d* are front and side views of the block or lower die.

In Fig. 3, No. 1, *e* is a round iron plate attached by screws *f f f* to lugs on top of die J, (No. II.) The plate *e* has a bolt through the center, and is attached by said bolt to a plate at the lower end of the rock-shaft. There are four screws through the plate attached to the lower end of the rock-shaft to adjust the upper die J. *h* is the top plate attached by screws *g g g* to the top of the die J, forming the tip of the same, to press the tip of the bonnet or bonnet-frame or similar article.

In Fig. 3, No. III is a top view of the plate *h* and die J, with heaters. No. IV is a side view, showing front and back of upper die, J.

Fig. 4 is the case which covers the heaters of upper die, J.

By varying the shape of the dies the above-described apparatus will press all kinds of bonnets and bonnet-frames or similar articles of every size and shape. The block or lower die may be made of marble or any other material that will not rust from the acid which may be in the articles and discolor them. The upper die may be made of cast-iron or other material, so arranged with a rim or flange around the lower edge as to hold heaters all around it to make it hot enough to press the articles. The lower block or die stands upright on an iron bed-plate, and is secured by screws to keep it in place. The bonnet or bonnet-frame or similar article is put upon the lower die, and the upper die is lowered onto it by the crank, and it is pressed by one impression; or, in other words, is pressed all over at the same time. The bonnet, frame, or similar article can be made either with the front and side crown in one piece or in two pieces. If in two pieces, they are both formed at once, and stuck together at the sides and top at one impression; and in cases where the shape is such that the bonnet, frame, or similar article can be formed of one piece of material, including the flaring face-piece, side crown, and tip, the same can be pressed in my dies the same as bonnets. On the block or lower die there are two small steel pins about a quarter of an inch in length made fast to said block. The pins have sharp points, and stand vertically in the lower die. When the bonnet-frame is put on the lower die, the pin sticks through the corners of the material and holds the same in place until the tip and side crown are put on the lower die. The upper die is then lowered by means of the crank, which upper die has two holes in it to receive the pins on the lower die, and at one impression the frame is made. The result is the same whether the front, side crown, and tip are in one, two, or three pieces. It makes no difference with the machine; it works as well in the one case as in the other.

None of the separate parts herein set forth are claimed; neither is any claim made to pressing of the crown-piece of bonnets or bonnet-frames separately, or to pressing the flaring face-piece or rim of the bonnet or other article to be worn upon the head by means of dies; but there is no instance before the invention of the said WILLIAM OSBORN, deceased, in which the dies were adapted to pressing upon the whole surface of the bonnet, frame, or similar article at one operation, thereby the whole article was pressed to the proper shape by one operation, whether the same was a bonnet or similar article made up of any number of pieces sewed together, (as in a straw or similar bonnet or other article,) or made of two, three, or more pieces, (as in a frame of buckram or similar material.) And by such dies acting upon the whole surface of such bonnet, frame, or similar article it became possible to press in dies at one operation the bonnet, frame, or similar article formed of one piece of material.

It will be evident that this invention is the same whether applied to pressing a bonnet, frame, or other article to be worn on the head, whatever may be the size or shape according to the fashion, or whatever name may be applied to it in the trade; therefore

What is claimed as new and the original invention of the said WILLIAM OSBORN, deceased, is—

1. Pressing the whole of a bonnet, frame, or similar article at one operation by dies, substantially as specified, whether formed of one or of several pieces and irrespective of the particular size or shape.

2. Forming the side crown and flaring face-piece of a bonnet-frame in one piece or at one operation, as specified.

In witness whereof I have hereunto set my signature this 5th day of March, 1860.

MARY J. OSBORN,
*Executrix.*

Witnesses:
LEMUEL W. SERRELL,
THOS. GEO. HAROLD.